UNITED STATES PATENT OFFICE.

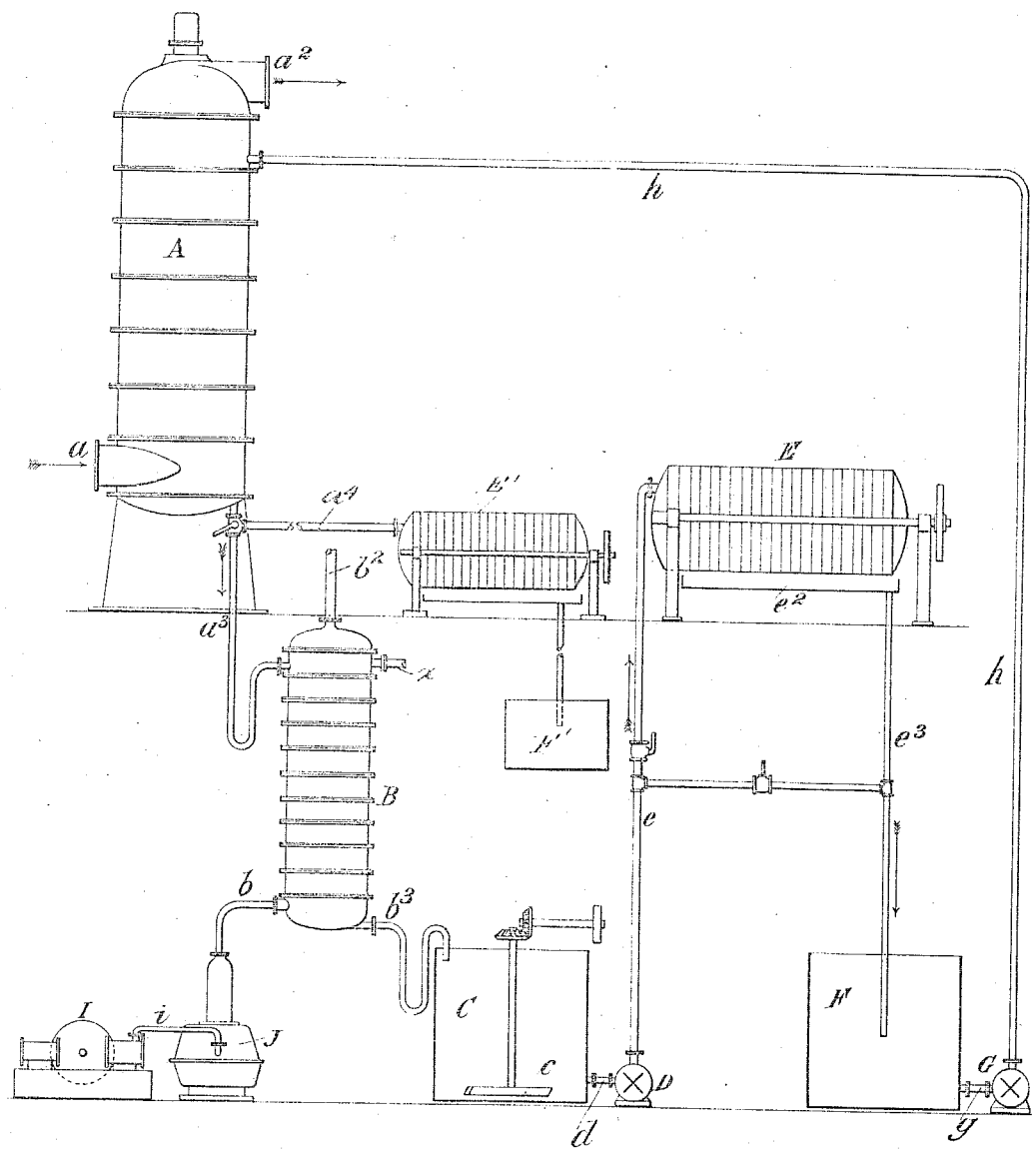

WALTHER FELD, OF HÖNNINGEN-ON-THE-RHINE, GERMANY.

PROCESS OF OBTAINING SULFUR.

985,667. Specification of Letters Patent. Patented Feb. 28, 1911.

Application filed August 31, 1909. Serial No. 515,506.

*To all whom it may concern:*

Be it known that I, WALTHER FELD, a subject of the King of Prussia and the German Emperor, residing at Hönningen-on-the-Rhine, in the Kingdom of Prussia and German Empire, have invented new and useful Improvements in Processes of Obtaining Sulfur, of which the following is a specification.

This invention relates principally to the treatment of sulfureted hydrogen and sulfur dioxid for the obtainment of sulfur therefrom, the sulfur being obtained as such, or, if desired, being utilized for the obtainment of sulfur dioxid, sulfuric acid, or sulfuric acid salts. The sulfureted hydrogen and the sulfur dioxid may be in a pure condition, or either of them, or both, may be mixed with other gases; for example, the sulfureted hydrogen may be contained in coal gas, and the sulfur dioxid in the gases from sulfur burner, in which sulfur is burned with air.

To carry out this invention, the gases containing sulfureted hydrogen and sulfur dioxid respectively (presuming that the gases are not taken in their pure condition) are treated, either simultaneously, or one after the other, with a liquid containing, in solution, or suspension, or partly in solution and partly in suspension, such compounds as will cause the sulfureted hydrogen and sulfur dioxid to react upon one another, and sulfur to be obtained. Suitable compounds to assist, or serve as a medium for, this reaction are compounds of metals the sulfids of which on the one hand are insoluble in basic, or in neutral, solutions, and, on the other hand, are decomposed by sulfur dioxid alone, or by sulfur dioxid in the presence of air, or other oxidizing agent, or sulfur, or in the presence of a mixture thereof alone or with basic or acid substances. Such compounds are, for instance, the oxids, hydroxids, carbonates, sulfids, sulfites, thionates, and all basic salts, as well as the acid or neutral, weak acid salts of zinc, manganese, iron, or other metals, as well as the neutral or acid salts of these metals with weak acids, the sulfids of which answer the hereinbefore mentioned requirements.

The way of performing the process according to this invention will vary according to the special condition of the gases containing the sulfureted hydrogen, or the sulfur dioxid, or both, and according to the metal and the compound thereof which is used. If, for instance, zinc oxid be used for the extraction of sulfureted hydrogen from coal gas, the zinc oxid is suspended in water, or in other suitable liquid (such as salt solution, oil, or the like,) and the coal gas is treated with this suspension. By the action of the sulfureted hydrogen in the coal gas, zinc sulfid (ZnS) is formed. If this suspension, now containing zinc sulfid (alone, or together with undecomposed zinc oxid, be treated with sulfur dioxid, or with gases containing sulfur dioxid, the sulfid is decomposed, forming free sulfur and a soluble thiosulfate, or polythionic salts of zinc, or both. (I will, for brevity, hereinafter refer to the thiosulfates, polythionates, and their compounds, as "thionates"). This regenerated zinc solution is again used for treating gases containing sulfureted hydrogen, but the reaction is somewhat different from that before stated. The thionates are decomposed and zinc sulfid, together with free sulfur, is formed. By treating this solution alternately with sulfureted hydrogen and sulfur dioxid, the reaction between both gases, by means of the zinc compounds, goes on continuously. By this treatment metallic sulfid is precipitated by sulfureted hydrogen and is redissolved by sulfur dioxid alternately, forming soluble zinc thionate the metallic compound being thus used repeatedly in a cyclic process.

Instead of beginning with the treatment of sulfureted hydrogen by the zinc oxid suspension, the operation can be started with sulfur dioxid, in which case zinc sulfite ($ZnSO_3$) is at first formed from the zinc oxid, and this, if treated with sulfureted hydrogen, is decomposed, forming zinc sulfid (ZnS), sulfur dioxid being liberated, this, *in statu nascendi*, forming free sulfur by its action upon the sulfureted hydrogen. The operations then proceed as hereinbefore described in a cyclic process.

Instead of treating the gases alternately with the liquor containing the zinc compounds, the gases may be treated simultaneously therewith, or they may be mixed together before they are treated with the liquor. The amount of sulfur formed in the liquor is always according to the proper proportion of the respective gases. If there be less of one gas than is necessary to complete the reaction, the excess of the other gas will be nevertheless absorbed by the zinc compounds. By afterward treating the liquor with gas such as that which was deficient in the gas mixture, the reaction will be completed in the liquor. Whatever may be the intermediate compounds formed, they do not interfere with the final reaction, free sulfur being always obtained because the sulfur dioxid reacting upon the zinc-sulfid forms thionates and free sulfur and the sulfureted hydrogen, acting upon the thionates, forms again zinc sulfid and free sulfur. Both zinc compounds are alternately decomposed and regenerated.

The liquor for the treatment of the gases may be used boiling, warm, or cold, the reaction in any case, being complete. The gases may be hot, or cool. The liquor will gradually accumulate sulfur. If this sulfur be dissolved by the liquor, it can be separated therefrom by crystallization, while if it be insoluble in the liquor, it can be separated from it by filtration, or decantation, or by melting it out of the liquor. The separation of the sulfur can be effected at any convenient stage of the process, but it is most conveniently effected after the treatment with sulfur dioxid, when the zinc compounds are dissolved. For the purpose of melting the sulfur, the liquor is heated to a temperature at which sulfur melts, namely from about 110°, to about 160°, centigrade, or even above the latter temperature, the heating being effected under steam pressure, directly or indirectly, by steam, or other heat. Air may be blown through the liquor before the melting, or filtering process in order to get rid of the excess of sulfur dioxid, or sulfureted hydrogen, absorbed in the liquor.

By the alternate, or simultaneous, and frequent treatment of the liquor with the gases and air and by the heating, some zinc sulfate is formed besides thionates and free sulfur. Such zinc sulfate, in neutral or acid solution, will have a poor reaction upon sulfureted hydrogen. In this case any basic compound (solid, or in solution, or suspension), or a salt with a weak acid, such as sulfite, thionate, or acetate, or a sulfid, (in solid form, or in suspension, or solution), may be added to the liquor, by which the zinc sulfate will be decomposed and a zinc compound will be regenerated which will be again acted upon by sulfureted hydrogen. The liquor also may be treated with gases containing ammonia alone, or ammonia and sulfureted hydrogen, such as illuminating gas, coke oven gas, and the like. In this case the liquor will simultaneously absorb ammonia and sulfureted hydrogen, soluble ammonium sulfate and insoluble zinc sulfid being formed, which can be separated by decantation, or filtration. There may be more ammonia in the gas, or in the liquor to be added, than is equivalent to the zinc sulfate. In this case besides ammonia sulfate, ammonium thionate will be formed which can easily be transformed into sulfate as hereinafter explained. The ammonium sulfate solution may be used for any required purpose and it may be distilled, or concentrated, and crystallized. The zinc sulfid, without, or after being separated from the ammonia salt solution, is reacted upon by treatment with sulfur dioxid as hereinbefore described and will thus be redissolved and re-used in the cyclic process.

In cases where the gases, containing sulfureted hydrogen, contain also ammonia, it may be convenient to increase the formation of zinc sulfate by heating, or boiling, the solution of the thionate (which may also contain free sulfur and zinc sulfid) when treating it with sulfureted hydrogen, or sulfur dioxid, or air, or with a mixture of these gases. By this treatment the thionates are decomposed forming sulfates and free sulfur and thus the sulfuric acid necessary for the formation of ammonia sulfate is indirectly formed from the sulfureted hydrogen and sulfur dioxid of the gas itself. By regulating the heat and the air supply, the formation of sulfuric acid may be regulated according to the amount of ammonia in the gas. Also ammonia from other sources may be used, such as gases or vapors, containing ammonia, or weak acid salts of ammonia, crude gas liquor, and the like, and this ammonia may be transformed into sulfate by heating it with the zinc liquor, during, or after the treatment of the liquor with sulfureted hydrogen, or sulfur dioxid.

The sulfur recovered by either method can be used for any required purpose. Part of such sulfur may be burned to sulfur dioxid for treatment of the zinc sulfid when the process is used for the purification of gases containing no sulfur dioxid, but sulfureted hydrogen, either alone, or together with ammonia. Instead of procuring the sulfur dioxid necessary for this process by burning sulfur, the liquor containing the zinc sulfid may be treated with extraneous gases containing sulfur dioxid. Suitable gases are the gases from boiler furnaces, or from ovens, gas producers, retorts, or the like, which gases contain sulfur dioxid produced from the sulfur in the fuel, or ores.

In cases where the process is to be used for the purification of gases containing sulfur dioxid, but no sulfureted hydrogen, or an insufficient amount thereof, sulfureted hydrogen from other sources may be used.

Instead of treating the gases containing sulfur dioxid, or sulfureted hydrogen, (without, or together with ammonia) with a liquor containing zinc compounds, or other metal compounds capable of causing similar reaction, the gases may be treated simultaneously, or one after the other, with zinc compounds, or with other metal compounds capable of causing similar reaction, in a solid, or humid state. In this case the final products (sulfur, metal sulfid, thionates and sulfate) may be separated from one another by extraction, precipitation and filtration and the metallic sulfid will be redissolved by sulfur dioxid forming soluble metallic thionate which is re-used in the cyclic process.

The foregoing examples do not specify all the ways in which the process may be carried out, as they will vary according to conditions and requirements, but from the said examples the treatment generally will be understood.

If instead of zinc compounds, other metallic compounds of the aforesaid character be used, the gases will react in a similar way.

The reaction of sulfur dioxid upon zinc sulfid is rather slow, so that no sulfureted hydrogen is liberated by it, but the reaction of sulfur dioxid upon the sulfids of iron, or manganese, is of considerable intensity. In order to avoid, in this case, liberation of sulfureted hydrogen (small though it may be) the liquor containing the metal sulfid must be well mixed with the gases containing sulfur dioxid. The liberation of sulfureted hydrogen is however completely avoided, if the liquor, containing the metal sulfid, be run into a solution containing sulfur dioxid in excess. In this case all the sulfureted hydrogen liberated from the metal sulfid, is, *in statu nascendi* decomposed by the sulfur dioxid in excess, the metallic sulfid being redissolved in the form of metallic thionate which is reused in the cyclic process.

In the accompanying drawing an apparatus is diagrammatically shown in which the process may be carried out.

I will explain, with reference to the accompanying drawing, a way in which the process according to this invention may be carried out, but I do not limit myself to this particular way and apparatus, as any other convenient way and apparatus may be used for the purpose.

A, is a vertical gas washer and B, is an absorption tower, both of these containing a number of superposed chambers.

C and F are tanks for liquor.

E is a filter-press.

D and G are pumps.

I is an air compressor and J is a sulfur burner.

I will presume that the apparatus is to be used for the extraction of sulfureted hydrogen from coal gas. The gas enters the washer A at $a$ and is treated in this washer by the liquor, containing, for example, zinc thionate. By the action of this liquor the gas is purified and leaves the washer at $a^z$.

The liquor is constantly pumped up through the pipe $h$ and into the washer A by the pump G. This liquor, when it leaves the washer A, contains sulfid of zinc as well as sulfur and undecomposed zinc thionate and it enters the absorption tower B by the pipe $a^3$, and, while the liquor runs through it, air, containing sulfur dioxid, is blown through the said apparatus B, the said air and sulfur dioxid entering at $b$. The liquor absorbs sulfur dioxid and this acts upon the zinc sulfid, most of which will redissolve in forming free sulfur and regenerating zinc thionate which is reused in the cyclic process. The liquor leaving the apparatus B by the pipe $b^3$ enters the tank C, where it is stirred by the stirrer $c$ until all, or nearly all, of the zinc sulfid is dissolved. Then the liquor, containing the regenerated zinc thionate in solution and free sulfur in suspension is pumped, by the pump D, through the pipe $d$ and up, by the pipe $e$, into the filter-press E. The insoluble sulfur is retained in this press and the liquor runs into the receptacle $a^2$ and by the pipe $e^3$ to the tank F, whence it is pumped through the pipe $g$ by the pump G and through the pipe $h$ again to the washer A. A part of the sulfur from the filter-press E may be dried and be burned in the sulfur burner J. For this purpose air is blown through the said pipe $i$ into the said burner J by the air compressor I. The gases coming from the burner J (which gases contain sulfur dioxid, together with excess of air), enter the tower B by the pipe $b$, and the waste gases, after having given off their sulfur dioxid to the liquor running through the tower B, leave this apparatus by the pipe $b^2$.

When the hydrogen sulfid gas also contains ammonia, and it is desired to separate out the ammonia sulfate solution, a filter press $E^1$ (like E) and a second tank $F^1$ may be used. The liquor coming from the washer A is carried by the pipe $a^4$ into the filter press $E^1$. The metallic sulfid is retained in the filter-press, the ammonia sulfate solution running to the tank $F^1$. The metallic sulfid mud, retained in the press $E^1$ is run into B at $x$ and then treated with sulfur dioxid coming from J.

In the following claims it is to be understood that the treatment referred to includes dealing with the gases referred to either simultaneously, or one after the other, that a metallic compound, or a compound of any particular metal, includes any compound (and also salts of basic, neutral, or acid reaction) of the character hereinbefore stated and whether used in a solid, or humid, state, and that ammonia includes also liquor, or gases, containing ammonia. The claims also are to be read as including the treatment claimed whether the metallic compounds be treated in solution, or partly in solution and partly in suspension, and whether heat be applied, or not, at any suitable stage of the process, and whether, or not the heated liquid be treated with air simultaneously with, or subsequently to treatment with the gases, or whether the gases be treated in a hot, warm or cool condition.

I claim as my invention:

1. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur and a soluble salt are formed.

2. A process of obtaining sulfur which comprises the steps of treating with hydrogen sulfid, a metallic compound which will react with hydrogen sulfid, to form an insoluble metallic sulfid and free sulfur, then decomposing the said metallic sulfid by means of sulfur dioxid to obtain free sulfur, and a soluble metallic salt, and thereafter subjecting the said salt to the action of hydrogen sulfid in a cyclic process.

3. A process of obtaining sulfur which comprises the steps of subjecting at an elevated temperature, to the successive action of hydrogen sulfid and sulfur dioxid, a compound of a metal the sulfid of which is insoluble under the conditions of the reaction but is decomposed by the sulfur dioxid, whereby free sulfur is formed.

4. A process of obtaining sulfur which comprises the steps of treating with hydrogen sulfid a metallic compound which will react with hydrogen sulfid to form an insoluble metallic sulfid and free sulfur, then decomposing the said metallic sulfid by means of sulfur dioxid to obtain free sulfur, and thereafter subjecting the resulting metallic compound to the action of hydrogen sulfid in a cyclic process, the sulfur being recovered after treatment with sulfur dioxid for the purpose specified.

5. A process of obtaining sulfur which comprises the steps of treating with hydrogen sulfid a metallic compound which will react with hydrogen sulfid to form an insoluble metallic sulfid and free sulfur and then decomposing the said metallic sulfid by means of sulfur dioxid to obtain free sulfur, removing any excess of sulfur dioxid or sulfureted hydrogen present after the reactions and then recovering the sulfur.

6. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur is formed, said reaction being carried on in the presence of a substance adapted to decompose any metallic sulfates which may be formed during the process.

7. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur is formed, said reaction being carried on in the presence of a basic substance adapted to decompose any metallic sulfates which may be formed during the process.

8. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur is formed, said reaction being carried on in the presence of ammonia whereby any metallic sulfates which may be formed during the process are decomposed.

9. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur is formed, said reaction being carried on at an elevated temperature and in the presence of ammonia whereby the quantity of metallic sulfates formed and then decomposed by the ammonia is increased.

10. A process of obtaining sulfur which comprises the steps of treating with a gas containing hydrogen sulfid and ammonia, a metallic compound which will react with hydrogen sulfid to form an insoluble metallic sulfid and free sulfur and then decomposing the said metallic sulfid by means of a gas containing sulfur dioxid to obtain a soluble metal salt and free sulfur.

11. A process of obtaining sulfur which comprises the steps of treating, with a gas containing hydrogen sulfid and ammonia, a metallic compound which will react with hydrogen sulfid to form an insoluble metallic sulfid and free sulfur and then decomposing the said metallic sulfid by means of a gas containing sulfur dioxid to obtain a soluble metal salt and free sulfur, said reactions being carried on at an elevated temperature whereby the quantity of metallic sulfates formed during the reactions and decomposed by the ammonia is increased.

12. A process of obtaining sulfur which comprises the steps of treating, with a gas containing hydrogen sulfid and ammonia, a metallic compound which will react with hydrogen sulfid to form an insoluble metallic sulfid and free sulfur and then decomposing the said metallic sulfid by means of a gas containing sulfur dioxid to obtain a soluble metal salt and free sulfur, said reactions being carried on at an elevated temperature, whereby the quantity of metallic sulfates formed during the reactions and decomposed by the ammonia is increased, separating the ammonium sulfate solution from the insoluble metallic sulfid after treatment with hydrogen sulfid and thereafter subjecting the resulting metallic sulfid to the successive action of sulfur dioxid and hydrogen sulfid in a cyclic process.

13. A process of obtaining sulfur which comprises the steps of subjecting to the successive action of hydrogen sulfid and sulfur dioxid, a compound of a metal the sulfid of which is insoluble under the conditions of the reaction, but is decomposed by the sulfur dioxid, whereby free sulfur is formed, said sulfur dioxid being employed in excess in order to avoid the liberation of sulfureted hydrogen.

14. A process of obtaining sulfur which consists in subjecting to the successive action of gases containing hydrogen sulfid and sulfur dioxid, a liquor containing a compound of a metal the sulfid of which is insoluble under the conditions of the reaction but is decomposed by the sulfur dioxid, whereby free sulfur and a soluble salt are formed.

15. A process of obtaining sulfur which comprises the steps of treating with a gas containing hydrogen sulfid a liquid containing a metallic compound which will react with said sulfid to form an insoluble metallic sulfid and free sulfur, said treatment being carried on in the presence of ammonia, and then decomposing said metallic sulfid by means of sulfur dioxid to obtain free sulfur.

16. A process of obtaining sulfur which comprises the steps of subjecting to the action of a gas containing hydrogen sulfid a liquid containing a metallic compound which reacts with said sulfid to form an insoluble metallic sulfid and free sulfur, and then decomposing said metallic sulfid by subjecting said liquid to the action of a gas containing sulfur dioxid to obtain free sulfur.

17. A process of obtaining sulfur which comprises the steps of subjecting to the action of a gas containing hydrogen sulfid a liquid containing a metallic compound which reacts with said sulfid to form an insoluble metallic sulfid and free sulfur, and then decomposing said metallic sulfid by subjecting said liquid to the action of a gas containing sulfur dioxid to obtain free sulfur, separating said free sulfur from the solution and thereafter subjecting the resulting solution to the action of a gas containing hydrogen sulfid in a cyclic process.

18. A process of obtaining sulfur which consists in treating in a liquid and at an elevated temperature, with a gas containing hydrogen sulfid and ammonia, a metallic compound which will react with hydrogen sulfid to form an insoluble metallic sulfid and free sulfur and then decomposing said metallic sulfid by means of a gas containing sulfur dioxid to obtain a soluble metallic salt and free sulfur, said sulfur dioxid being employed in excess to avoid the liberation of sulfureted hydrogen, subjecting said metallic salt to the action of a gas containing hydrogen sulfid and ammonia, separating at this point, the ammonium sulfate solution from the metallic sulfid and then decomposing the metallic sulfid by means of a gas containing sulfur dioxid, repeating the cyclic process until the free sulfur is present in desired quantity, and then separating the sulfur from the liquid after a treatment of the liquid with sulfur dioxid and the removal of any excess sulfur dioxid or hydrogen sulfid, and then subjecting the metallic salt to the action of hydrogen sulfid in the cyclic process, substantially as described.

In testimony whereof I have signed my name to this specification in the presence of two subscribing witnesses.

WALTHER FELD.

Witnesses:
WOLDEMAR HAUPT,
HENRY HASPER.